(12) United States Patent
Tsugane et al.

(10) Patent No.: US 8,269,815 B2
(45) Date of Patent: Sep. 18, 2012

(54) DYNAMIC IMAGE DISTRIBUTION DEVICE AND METHOD THEREOF

(75) Inventors: Hideyuki Tsugane, Tokyo (JP); Makoto Okita, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 1156 days.

(21) Appl. No.: 12/067,248

(22) PCT Filed: Sep. 22, 2005

(86) PCT No.: PCT/JP2005/017469
§ 371 (c)(1),
(2), (4) Date: Mar. 18, 2008

(87) PCT Pub. No.: WO2007/034550
PCT Pub. Date: Mar. 29, 2007

(65) Prior Publication Data
US 2009/0237489 A1 Sep. 24, 2009

(51) Int. Cl.
*H04N 7/14* (2006.01)
(52) U.S. Cl. .............. 348/14.1; 348/14.08; 348/14.09
(58) Field of Classification Search .... 348/14.01–14.16, 348/21, 25
See application file for complete search history.

(56) References Cited

U.S. PATENT DOCUMENTS 8,063,929 B2 * 11/2011 Kurtz et al. ............... 348/14.08
2001/0056474 A1 12/2001 Arai

FOREIGN PATENT DOCUMENTS

| EP | 1154646 | 11/2001 |
|---|---|---|
| JP | 10-136144 | 5/1998 |
| JP | 11-234452 | 8/1999 |
| JP | 2001-52154 | 2/2001 |
| JP | 2001-117550 | 4/2001 |
| JP | 2001-168923 | 6/2001 |
| JP | 2002-55912 | 2/2002 |
| JP | 02-140650 | 5/2002 |
| JP | 2002-232601 | 8/2002 |
| JP | 2005-71350 | 3/2005 |
| WO | 01/43435 | 12/2000 |
| WO | 02/050653 | 6/2002 |
| WO | 2005/112453 | 11/2005 |

* cited by examiner

*Primary Examiner* — Suhan Ni (57) ABSTRACT

In a network system (1), in response to a user's operation on a video telephone (32) having no browser function, WEB data described in HTML is supplied from a WEB server (26) to a WEB browse server (4) by HTTP. The supplied WEB data is converted by the WEB browse server (4), for example, into dynamic image data in the MPEG format which can be displayed on the video telephone (32). Furthermore, the dynamic image data is distributed via a transmission path set between the WEB browse server (4) and the video telephone (32) by line switching to the video telephone (32) so as to be displayed. That is, in the network system (1), a user of the video telephone (32) having a dynamic image display function and an audio transmission function but no browser function can view a WEB image on the Internet.

17 Claims, 11 Drawing Sheets

WEB DATA

DYNAMIC IMAGE DISTRIBUTION DEVICE AND METHOD THEREOF

PRIORITY CLAIM

The present invention claims priority under 35 U.S.C. 119 to Japanese PCT Application Serial No. PCT/JP2005/017469, filed on Sep. 22, 2005, the disclosure of which is hereby incorporated by reference in its entirety.

TECHNICAL FIELD

The present invention relates to a dynamic image distribution device for distributing a desired image and a method thereof.

BACKGROUND ART

For example, JP 2001-117550 A discloses a method of dividing an image of HTML data and displaying the resultant. Further, JP 2002-055912 A discloses a method of displaying an image of HTML data on a mobile terminal device. However, the methods are required to provide a terminal device with software such as a browser for processing the HTML data to generate the image.

In other words, for example, even with a so-called video telephone configured to allow transmission of a dynamic image and audio between terminals, if the video telephone cannot execute software running as a browser, a user cannot view a WEB page available on the Internet or perform WEB browsing.

SUMMARY

Problem to be Solved by the Invention

The present invention has been made against the above-mentioned backdrop, and an object thereof is to provide a dynamic image distribution device which can display an image available on the Internet on a terminal device capable of displaying a dynamic image, and a method thereof.

Another object of the present invention is to provide a dynamic image distribution device which realizes WEB browsing through the Internet by use of a telephone capable of displaying an image but having no browser function, and a method thereof.

Means for Solving the Problem

In order to achieve the above-mentioned objects, according to the present invention, a dynamic image distribution device for distributing a dynamic image to an image display device for receiving the dynamic image distributed via a transmission path and displaying the dynamic image includes: conversion means for converting image data representing an image into a dynamic image in a format that can be displayed by the image display device; and dynamic image distribution means for distributing the dynamic image obtained as a result of the conversion to the image display device via the transmission path.

Further, according to the present invention, a dynamic image distribution system includes: an image display device for receiving a dynamic image distributed via a transmission path and displaying the dynamic image; and a dynamic image distribution device including: conversion means for converting image data representing an image into a dynamic image in a format that can be displayed by the image display device; and dynamic image distribution means for distributing the dynamic image obtained as a result of the conversion to the image display device.

Further, according to the present invention, a dynamic image distribution method of distributing a dynamic image to an image display device for receiving the dynamic image distributed via a transmission path and displaying the dynamic image includes: a conversion step of converting image data representing an image into a dynamic image in a format that can be displayed by the image display device; and a dynamic image distribution step of distributing the dynamic image obtained as a result of the conversion to the image display device via the transmission path.

Further, according to the present invention, a dynamic image distribution program for distributing a dynamic image to an image display device for receiving the dynamic image distributed via a transmission path and displaying the dynamic image causes a computer to execute: a conversion step of converting image data representing an image into a dynamic image in a format that can be displayed by the image display device; and a dynamic image distribution step of distributing the dynamic image obtained as a result of the conversion to the image display device via the transmission path.

Further, according to the present invention, a selection method includes: a display step of displaying a plurality of choices divided into a plurality of groups; a first selection step of selecting any one of the plurality of groups in response to any one of a plurality of selection operations; and a second selection step of selecting any one of the plurality of choices contained in the plurality of groups in response to any other one of the plurality of selection operations.

Effect of the Invention

With the dynamic image distribution device and the method thereof according to the present invention, it is possible to display an image available on the Internet on the terminal device capable of displaying a dynamic image.

In addition, with the dynamic image distribution device and the method thereof according to the present invention, it is possible to realize the WEB browsing through the Internet by use of the telephone capable of displaying an image but having no browser function.

BRIEF DESCRIPTION OF THE DRAWINGS

FIGS. 2(A) and (B) are diagrams showing modes of distributing a dynamic image in the network system, where part (A) shows the mode in which a dynamic image is distributed from a video telephone system to a video telephone via a WEB browse server, and part (B) shows the mode in which a dynamic image is distributed from a WEB server to a PDA device and a PC via the WEB browse server.

BEST MODE FOR CARRYING OUT THE INVENTION

Hereinafter, description will be made of an embodiment of the present invention.

Network System 1

Figure 1:
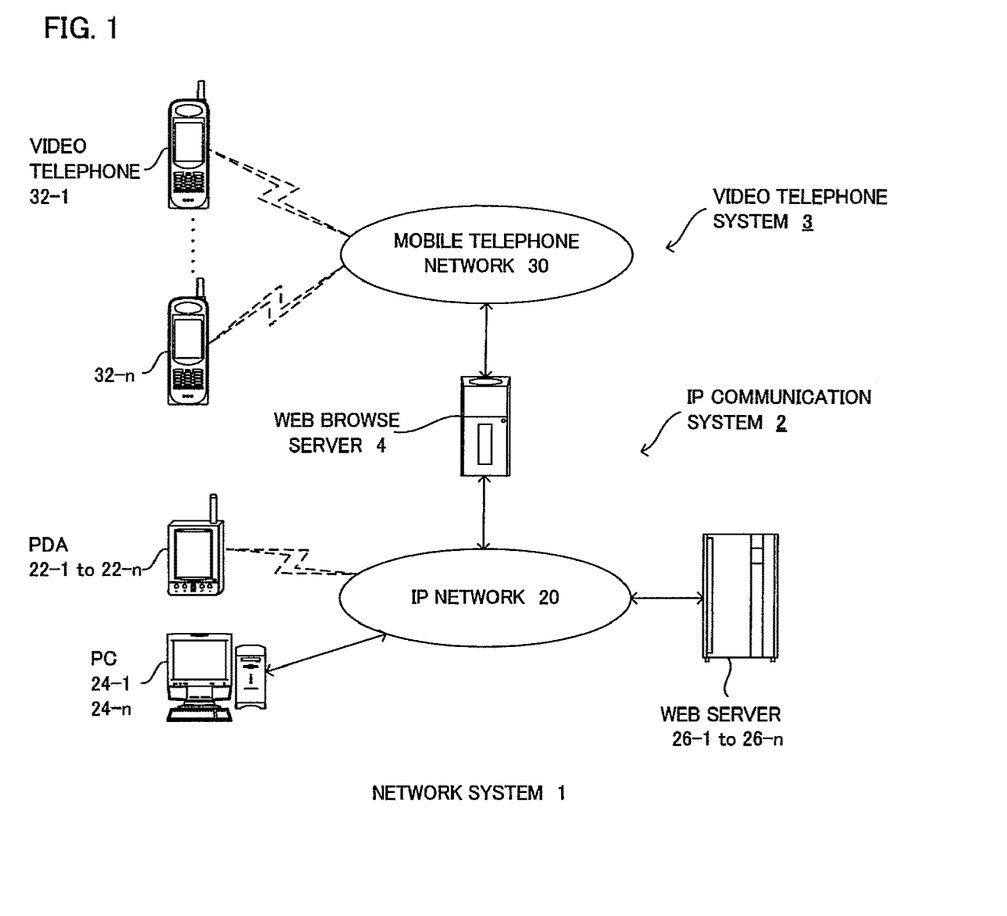
FIG. 1 is a diagram exemplifying a configuration of a network system to which a dynamic image distribution method according to the present invention is applied.

FIG. 1 is a diagram exemplifying a configuration of a network system 1 to which a dynamic image distribution method according to the present invention is applied. As shown in FIG. 1, the network system 1 is configured by including an IP communication system 2 and a video telephone system 3 used by, for example, a 3G mobile telephone which are connected to each other via a WEB browse server 4. The IP communication system 2 is configured by including personal digital assistance (PDA) devices 22-1 to 22-n, computers (PCs) 24-1 to 24-n, and WEB servers 26-1 to 26-n for supplying WEB page data (WEB data; described later by referring to FIG. 8), which are connected to one another via an IP network 20, such as a LAN, a WAN, and the Internet, for transmitting data by transmission control protocol/internet protocol (TCP/IP). The video telephone system 3 is configured by including video telephones 32-1 to 32-n and a mobile telephone network 30 for connecting by line switching between the video telephones 32-i and 32-j and between the video telephones 32-i and the WEB browse server 4.

Note that in the following description, the variables "m" and "n" each represent an integer equal to or larger than 1, and the variable "m" does not always represent the same number in all cases, or the variable "n" does not always represent the same number in all cases. The variables "i" and "j" each represent an integer from 1 to n, and are mutually different numbers in general. When any component that can be used as one of a plurality of components such as the PDA devices 22-1 to 22-n is indicated without distinction, the component may be referred to simply as "PDA device 22" or the like. The component such as the PDA device 22 that can be a main component in information processing or communications within the network system 1 may be referred to generically as "node". Also, in the following description, substantially the same components across the figures are denoted by the like reference numerals.

Figure 2:
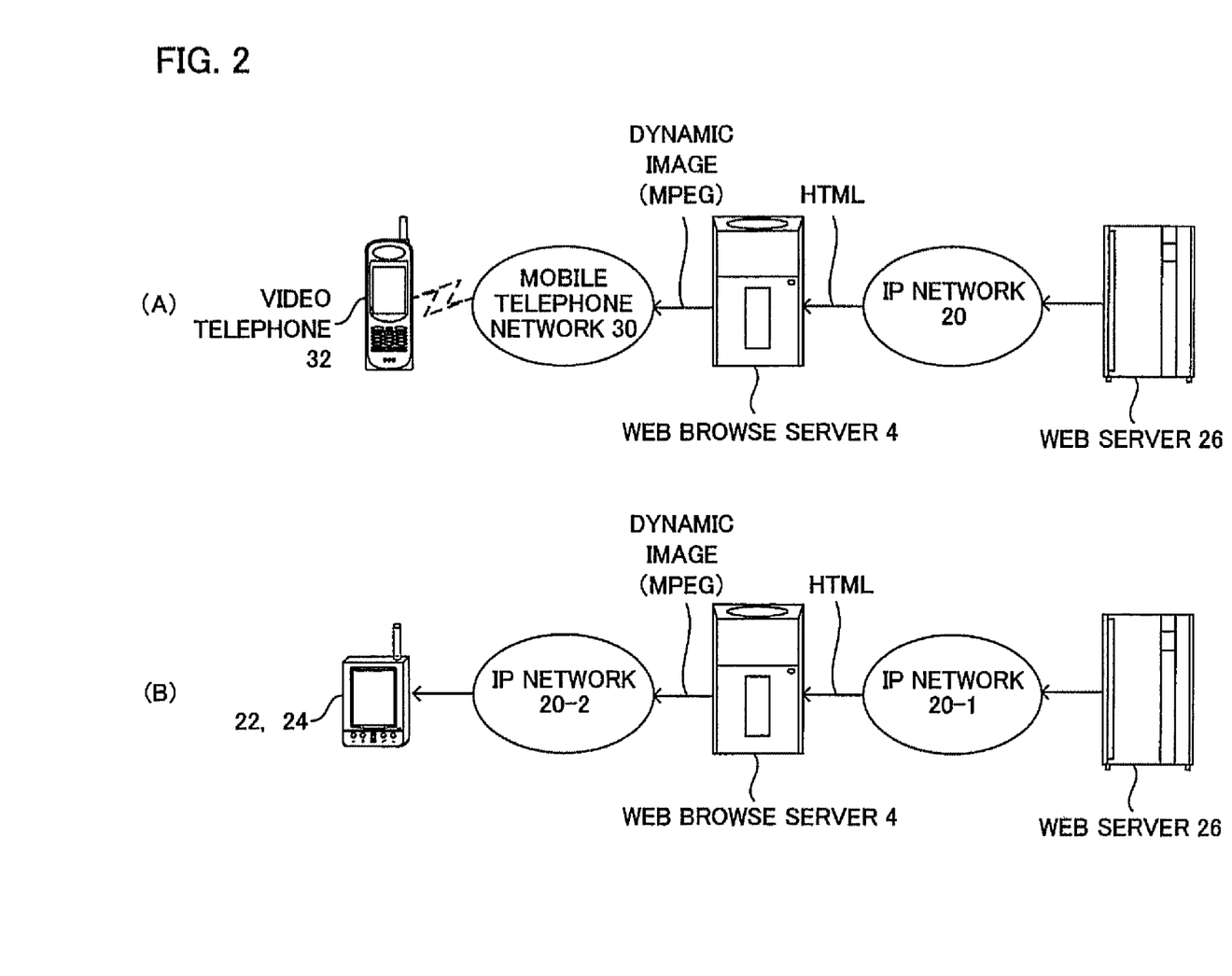

FIGS. 2(A) and (B) are diagrams showing modes of distributing a dynamic image in the network system 1, where part (A) shows the mode in which a dynamic image is distributed from the WEB server 26 to the video telephone 32 via the WEB browse server 4, and part (B) shows the mode in which a dynamic image is distributed from the WEB server 26 to the PDA device 22 and the PC 24 via the WEB browse server 4. However, two IP networks 20-1 and 20-2 shown in FIG. 2(B) may be the same IP network 20.

With those components, as shown in FIG. 2(A), in the network system 1, for example, in response to a user's operation on a video telephone 32 having no browser function, WEB data described in hypertext markup language (HTML) is supplied from the WEB server 26 to the WEB browse server 4 by hypertext transfer protocol (HTTP). The supplied WEB data is converted by the WEB browse server 4, for example, into dynamic image data in the moving picture experts group (MPEG) format which can be displayed on the video telephone 32. Further, the dynamic image data is distributed via a transmission path set between the WEB browse server 4 and the video telephone 32 by line switching to the video telephone 32, and displayed thereon. In other words, the network system 1 allows a user of the video telephone 32 having a dynamic image display function and an audio transmission function but no browser function to view an image of a WEB page on the Internet.

Note that as shown in FIG. 2(B), in the network system 1, in response to the user's operation on the PDA device 22 and PC 24 that are capable of displaying a dynamic image, a document containing a text, image, and the like on a WEB page is converted into a dynamic image, and sessions set up between the WEB browse server 4 and the PDA device 22 and PC 24 are used to distribute the dynamic image to the video telephone 32 by store-and-forward switching, whereby the dynamic image is displayed thereon.

Hereinafter, for concreteness and clarity, description will be made of the following specific examples (1) to (4) unless otherwise indicated.

(1) A dial tone multi frequency (DTMF) signal used for an operation is transmitted from the video telephone 32 to the WEB browse server 4.

(2) In response to the operation using the DTMF signal from the video telephone 32, as shown in FIG. 2(A), a dynamic image is distributed to the video telephone 32 from the WEB server 26 via the WEB browse server 4.

(3) Between the video telephones 32 and between the video telephone 32 and the WEB browse server 4, dynamic image data other than that in the MPEG format can be transmitted, but the dynamic image data of MPEG format is hereinafter transmitted therebetween.

(4) In the WEB browse server 4, controls described in various formats can be executed, but the control described in VXML is hereinafter executed.

Hardware

Hereinafter, description will be made of a hardware configuration of each of the components of the network system 1.

Figure 3:
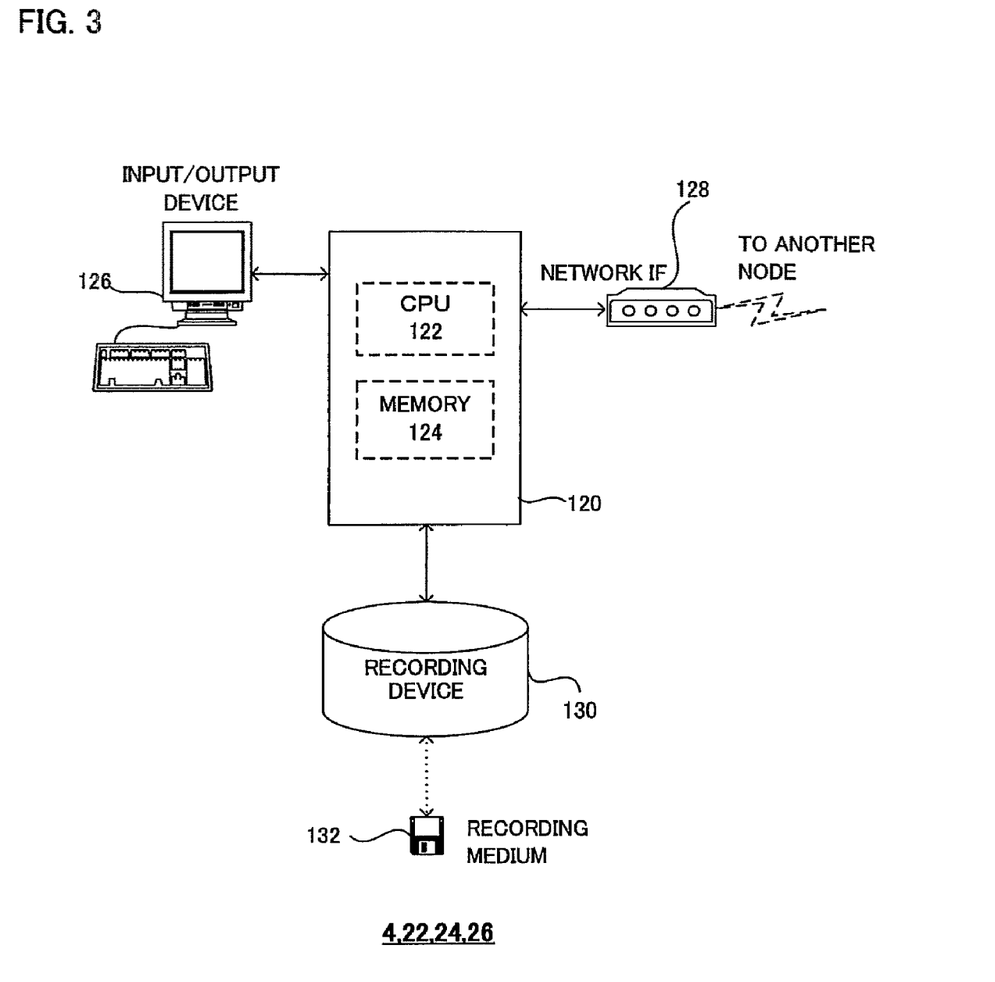
FIG. 3 is a diagram exemplifying a hardware configuration of each of the WEB server, the WEB browse server, the PDA device, and the PC that are shown in FIG. 1.

FIG. 3 is a diagram exemplifying the hardware configuration of each of the WEB server 26, the WEB browse server 4, the PDA device 22, and the PC 24 that are shown in FIG. 1. As shown in FIG. 3, the WEB server 26, the WEB browse server 4, the PDA device 22, and the PC 24 are each configured by including: a main body 120 that includes a CPU 122 and a memory 124; an input/output device 126 that includes a keyboard and a display device; a network interface (IF) 128 for performing communications with another node via the IP network 20 or the mobile telephone network 30; and a recording device 130, such as a CD drive and a HD drive, for performing recording and reproduction of data on a recording medium 132. In short, each of the WEB server 26, the WEB browse server 4, the PDA device 22, and the PC 24 has the hardware components as a computer capable of information processing and communications with another node.

Video Telephone 32

Hereinafter, description will be made of the video telephone 32.

Figure 4:
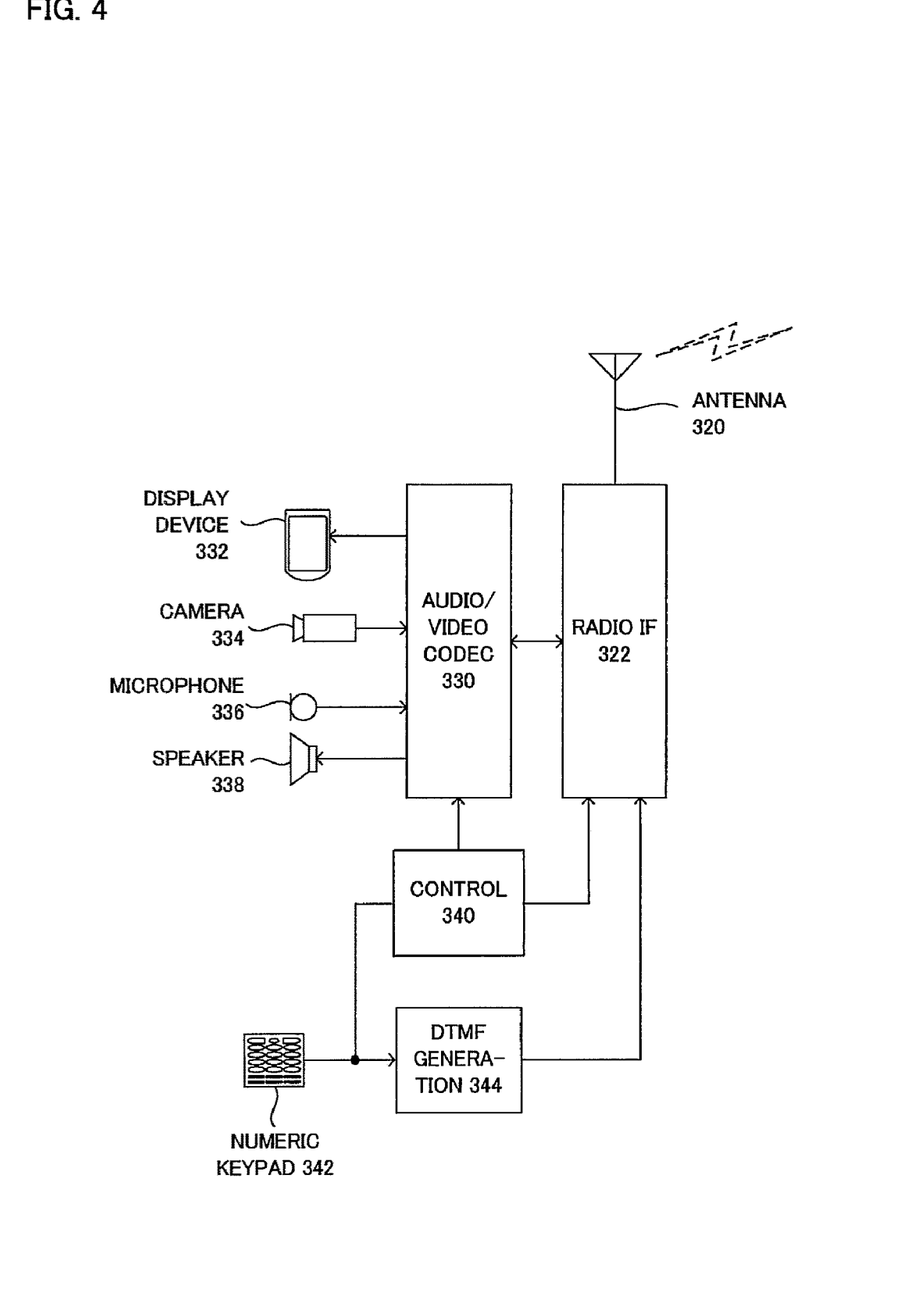
FIG. 4 is a diagram exemplifying a configuration of the video telephone shown in FIG. 1.

FIG. 4 is a diagram exemplifying a configuration of the video telephone 32 shown in FIG. 1. As shown in FIG. 4, the video telephone 32 includes an antenna 320, a radio IF 322, an audio/video CODEC 330, a display device 332 such as an LCD, a camera 334, a microphone 336, a speaker 338, a control section 340, a numeric keypad 342, and a DTMF generation section 344. Note that each of the components of the video telephone 32 may be realized by dedicated hardware, or may be realized by software executed on a digital signal processor (DSP) or the like.

The antenna 320 and the radio IF 322 perform transmission of a signal necessary for setting a line with respect to the mobile telephone network 30. The antenna 320 and the radio IF 322 further perform transmission of an audio, dynamic image, and DTMF signal with respect to another video telephone 32 or the WEB browse server 4 via a transmission path set for the mobile telephone network 30. The display device 332, which is, for example, a liquid crystal display device, displays the dynamic image generated by the audio/video CODEC 330 to show the dynamic image to the user. The camera 334, which is, for example, a CCD camera, takes images of the user, the background, and the like to generate a dynamic image, and outputs the dynamic image to the audio/video CODEC 330. The microphone 336 receives an audio such as the user's voice, and outputs the audio to the audio/video CODEC 330. The speaker 338 outputs the audio inputted from the audio/video CODEC 330, for example, the voice of a person on the other end or the audio accompanying a WEB page.

The control section 340 includes a CPU and a memory (not shown), and executes a program (not shown) to perform a processing for communications with respect to the mobile telephone network 30, a processing for controlling each component of the video telephone 32, and the like. The numeric keypad 342 includes buttons of numerals "0" to "9" and symbols such as "*" and "#" that are suitable for a signal input operation by DTMF, receives the user's operation, and outputs the operation to the DTMF generation section 344. In response to the user's operation performed on the buttons of the numeric keypad 342, the DTMF generation section 344 generates a DTMF signal corresponding to each of the numerals "0" to "9" and the symbols "*" and "#", and outputs the DTMF signal to the audio/video CODEC 330.

The audio/video CODEC 330 receives via the radio IF 322 dynamic image data in, for example, the MPEG format transmitted from another video telephone 32 and the WEB browse server 4, decodes the dynamic image data, and displays the dynamic image data on the display device 332. The audio/video CODEC 330 further decodes the audio data transmitted from another video telephone 32 and the WEB browse server 4, and outputs the audio data from the speaker 338. In addition, the audio/video CODEC 330 encodes the dynamic image inputted from the camera 334 into dynamic image data in the MPEG format, and outputs the dynamic image data to the radio IF 322. The audio/video CODEC 330 further encodes the audio inputted from the microphone 336 and the DTMF signal inputted from the DTMF generation section 344 into audio data, and outputs the audio data to the radio IF 322. In short, the video telephone 32 has components serving as a so-called video telephone capable of transmitting a dynamic image, audio, and DTMF signal with respect to another video telephone 32 and the WEB browse server 4.

Software

Hereinafter, description will be made of software executed on each of the components of the network system 1.

Figure 5:
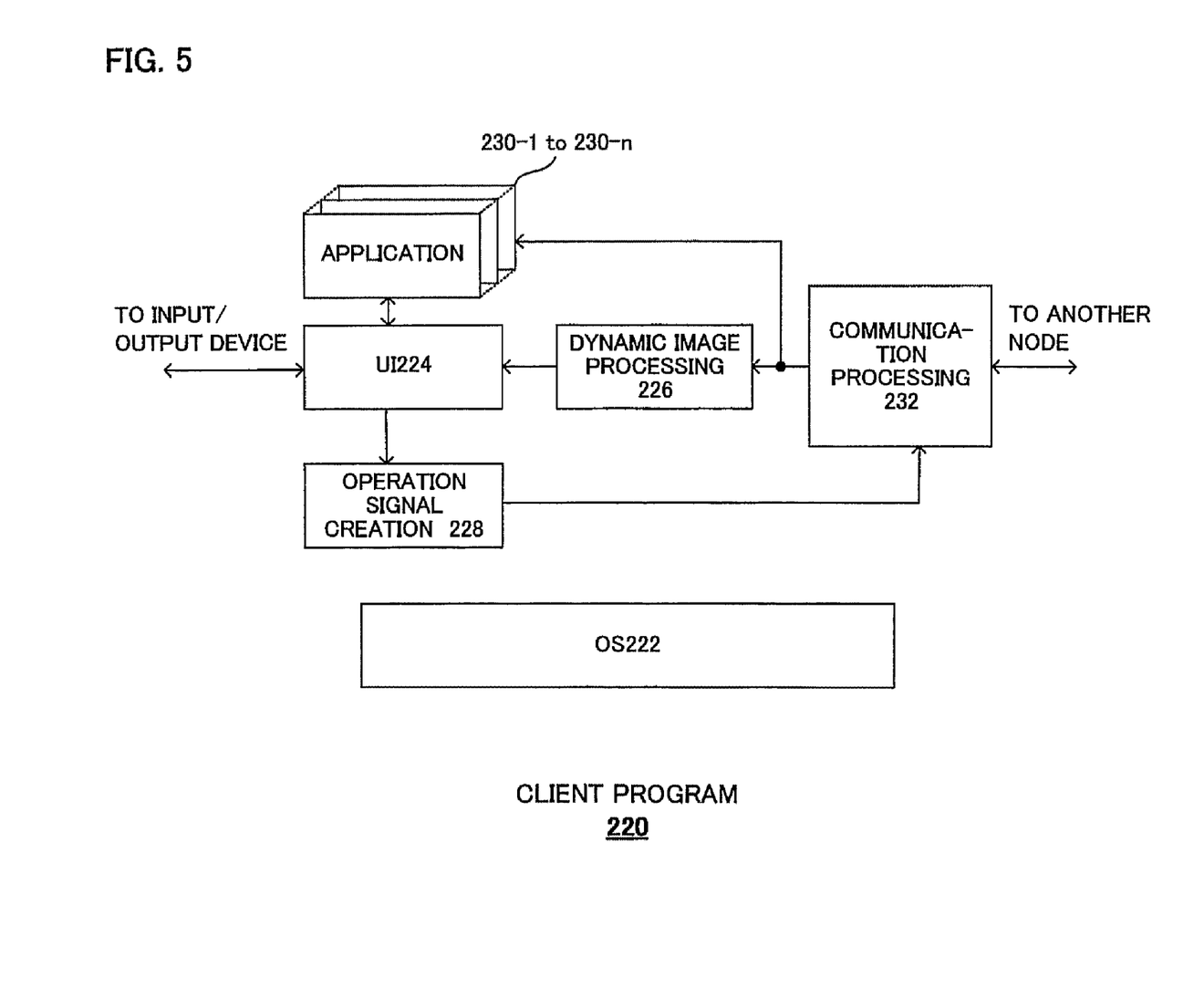
FIG. 5 is a diagram showing a client program executed on the PDA device and the PC that are shown in FIG. 1.

FIG. 5 is a diagram showing a client program 220 executed on the PDA device 22 and the PC 24 that are shown in FIG. 1. As shown in FIG. 5, the client program 220 includes an operating system (OS) 222 installed in the PDA device 22 and the PC 24, a user interface (UI) section 224, a dynamic image processing section 226, an operation signal creation section 228, various application sections 230-1 to 230-n such as a word processor, and a communication processing section 232. The client program 220 is supplied to the PDA device 22 and the PC 24 via, for example, the recording medium 132 (FIG. 3), loaded into the memory 124, and executed by the CPU 122 while concretely using the hardware of the PDA device 22 and the PC 24 via the OS 222 (the same applies to programs described hereinafter).

With those components, the client program 220 receives via the IP network 20 an input made by the user's operation performed on the keyboard of the input/output device 126 (FIG. 3) or the like, and transmits an operation signal corresponding to the DTMF signal on the video telephone 32 to the WEB browse server 4. Further, the client program 220 displays the dynamic image in the MPEG format transmitted from the WEB browse server 4 on the display device of the input/output device 126.

In the client program 220, the UI section 224 receives the user's operation performed on the input/output device 126, outputs the operation to the application section 230, and also controls the processing of the other components of the client program 220. The UI section 224 further displays the dynamic image data decoded by the dynamic image processing section 226 on the input/output device 126. The operation signal creation section 228 creates an operation signal corresponding to the DTMF signal on the video telephone 32 based on the user's operation received by the UI section 224, and outputs the signal to the communication processing section 232. The communication processing section 232 performs a processing necessary for communications with another node, receives dynamic image data in the MPEG format from the WEB browse server 4 via the IP network 20, and outputs the dynamic image data to the dynamic image processing section 226.

The communication processing section 232 also transmits the operation signal inputted from the operation signal creation section 228 to the WEB browse server 4 via the IP network 20. The dynamic image processing section 226 decodes the dynamic image data in the MPEG format inputted from the communication processing section 232, and outputs the dynamic image data to the UI section 224.

Figure 6:
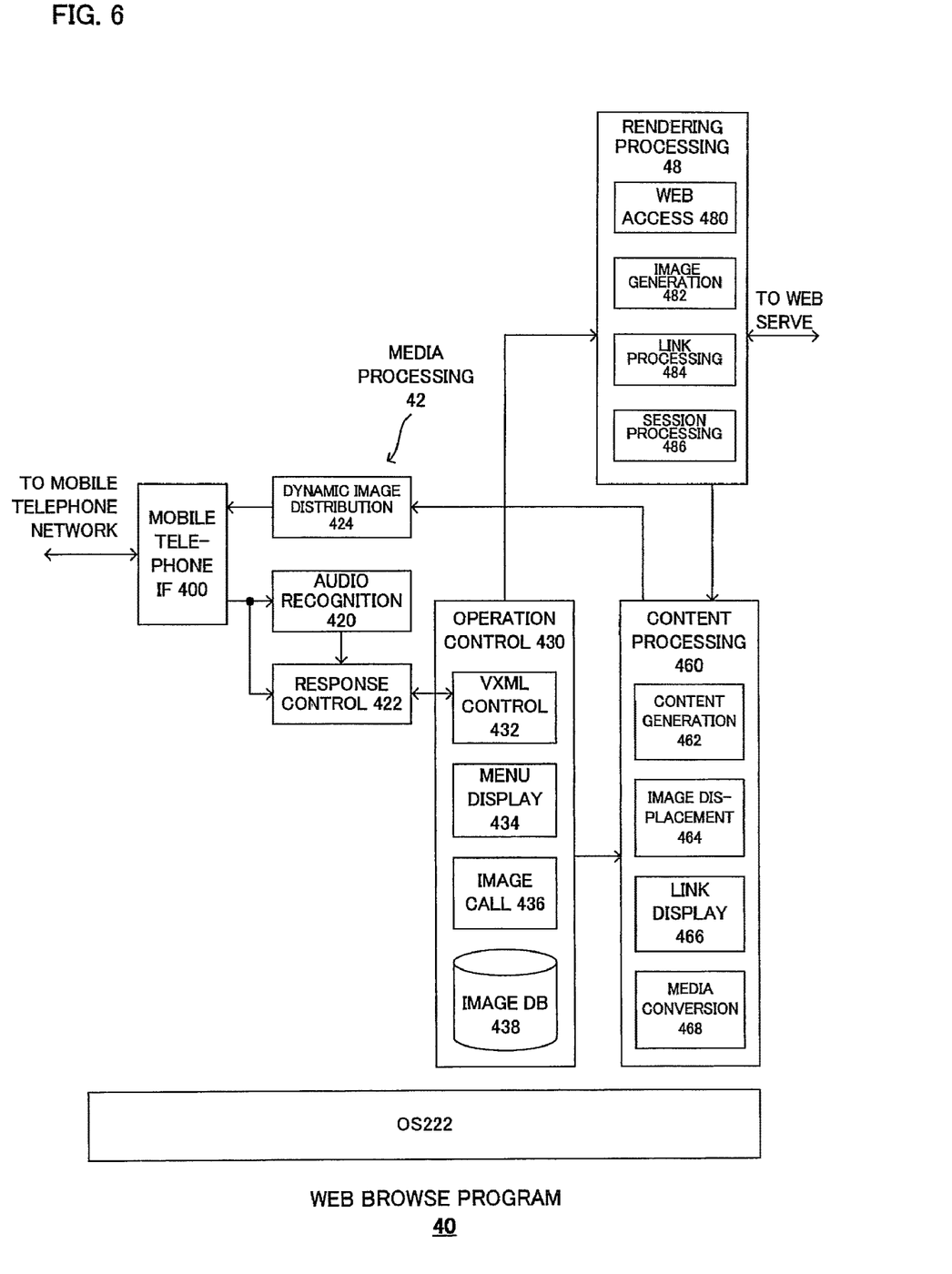
FIG. 6 is a diagram showing a WEB browse program executed on the WEB browse server shown in FIG. 1.

FIG. 6 is a diagram showing a WEB browse program 40 executed on the WEB browse server 4 shown in FIG. 1.

As shown in FIG. 6, the WEB browse program 40 includes a mobile telephone IF 400, a media processing section 42, and a rendering processing section 48. The media processing section 42 includes an audio recognition section 420, a response control section 422, a dynamic image distribution section 424, an operation control section 430, and a content processing section 460. The operation control section 430 includes a voice extensible markup language (VXML) control section 432, a menu display section 434, an image call section 436, and an image database (DB) 438. The content processing section 460 includes a content creation section 462, an image displacement section 464, a link display section 466, and a media conversion section 468. The rendering processing section 48 includes a WEB access section 480, an image creation section 482, a link processing section 484, and a session processing section 486.

With those components, the WEB browse program 40 creates static image data in the joint photographic experts group (JPEG) format or the like from WEB data that indicates the contents of a WEB page and contains text data, image data, and the like described in HTML, converts the static image data into the MPEG format suitable for display on the video telephone 32, and distributes the converted data to the PDA device 22, the PC 24, and the video telephone 32. In addition, the WEB browse program 40 receives an audio (user's voice or DTMF signal) for an operation from the video telephone 32 or the like, and based on the information indicated by the audio, performs a processing for realizing the viewing of the WEB page by use of the video telephone 32 or the like.

In the WEB browse program 40, the mobile telephone IF 400 is connected with the dynamic image distribution section 424, audio recognition section 420, and response control section 422 of the media processing section 42 via, for example, session initiation protocol (SIP). The mobile telephone IF 400 transmits dynamic image data and audio data to the video telephone 32 via a transmission path set by line switching in the mobile telephone network 30. In other words, the mobile telephone IF 400 performs the following processes (1) to (4):

(1) protocol conversion between the mobile telephone network 30 (FIG. 1) and the media processing section 42;

(2) transmission of dynamic image data in the MPEG format and audio data to the video telephone 32;

(3) an output of the audio data of the audio and DTMF signal, which is transmitted from the video telephone 32, to the response control section 422; and (4) reception of the dynamic image data in the MPEG format, which is transmitted from the video telephone 32 (in correspondence with which, the WEB browse program 40 may be added with a component for recording the dynamic image and audio).

The response control section 422 functions as a DTMF decoder, and when the audio data of the DTMF signal is transmitted for the purpose of an operation from the video telephone 32, outputs an input value corresponding to any one of the numerals "0" to "9" and the symbols "*" and "#" based on the user's operation performed on the numeric keypad 342 to the VXML control section 432. When the audio data of the user's voice is transmitted for the purpose of an operation from the video telephone 32, the audio recognition section 420 recognizes the user's voice inputted via the response control section 422, and outputs an input value corresponding to one of the numerals "0" to "9" and the symbols "*" and "#" to the VXML control section 432 via the response control section 422. The dynamic image distribution section 424 distributes the dynamic image data in the MPEG format to the video telephone 32 via the mobile telephone IF 400 and the mobile telephone network 30.

Set for the VXML control section 432 is a rule described in VXML for associating an input value inputted from the response control section 422 with a processing to be executed based on the input value. According to this rule, the VXML control section 432 selects the processing to be executed based on the input value, and controls the menu display section 434, the content processing section 460, and rendering processing section 48, to thereby realize the selected processing.

FIGS. 7(A)-(D) are diagrams exemplifying a dynamic image that is generated by the WEB browse program 40 shown in FIG. 6 and displayed on the display device 332 (FIG. 3) of the video telephone 32, where part (A) shows a menu image, part (B) shows a static image of a WEB page generated in response to a selection operation performed on the menu image, and parts (C) and (D) show dynamic images within the static image shown in part (B) which are actually displayed on the display device 332 in response to selection operations. The image DB 438 stores a dynamic image used for creation of the menu image exemplified in FIG. 7(A).

Figure 7:
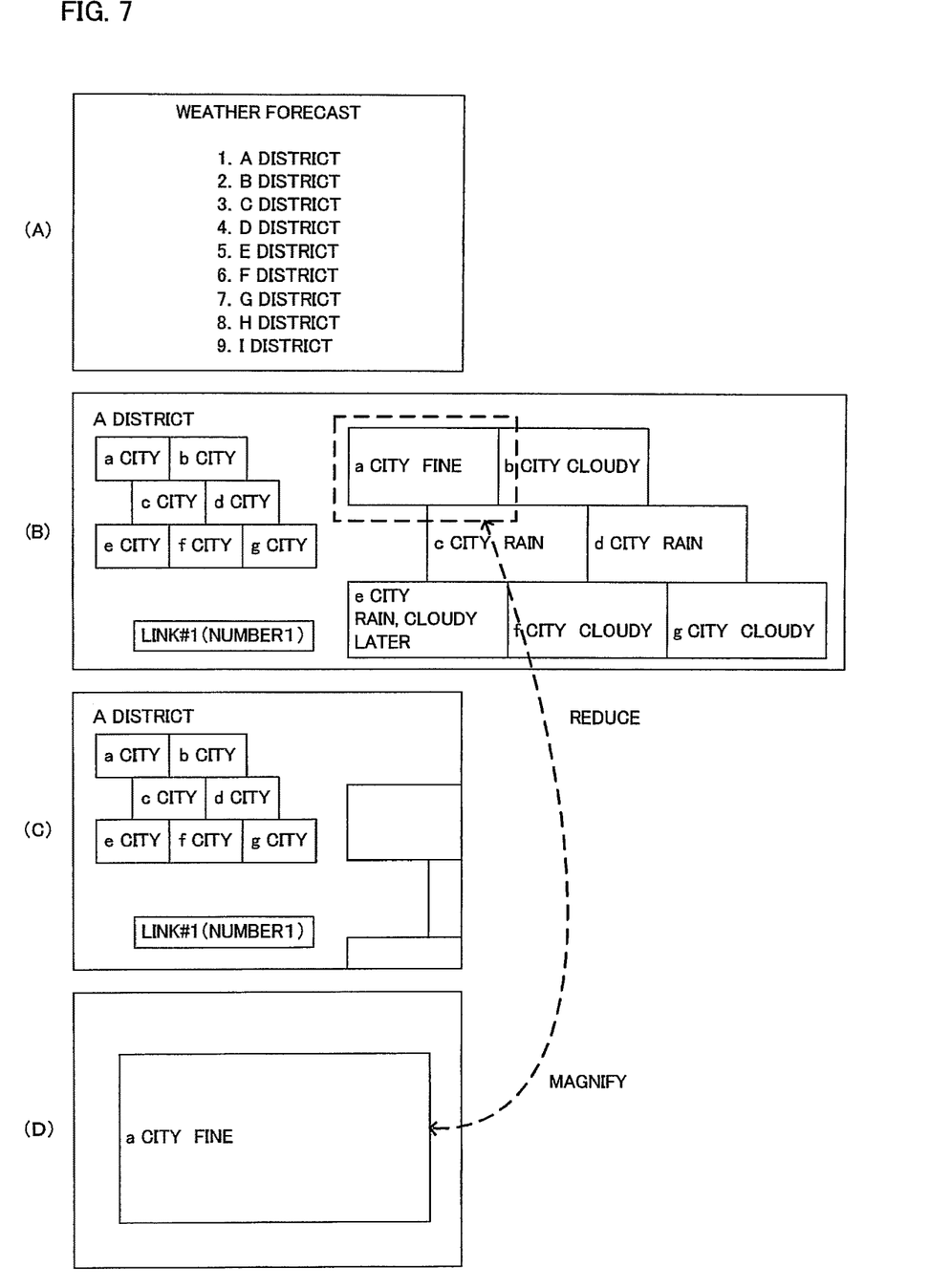
FIGS. 7(A)-(D) are diagrams exemplifying a dynamic image that is generated by the WEB browse program shown in FIG. 6 and displayed on the display device (FIG. 3) of the video telephone, where part (A) shows a menu image, part (B) shows a static image of a WEB page generated in response to a selection operation performed on the menu image, and parts (C) and (D) show dynamic images within the static image shown in part (B) which are actually displayed in response to selection operations.

Note that FIG. 7(A) exemplifies a case where a menu screen indicates the title of a dynamic image distributed to the video telephone 32 as well as its choices (A District to I District) each of which is associated with an operation (depression of one of the "numerals 1 to 9" of the numeric keypad 342 of the video telephone 32 that is associated with the URL of a WEB page on a weather forecast for one of A District to I District) for making a selection from the choices.

The image call section 436 calls the dynamic image stored in the image DB 438 in response to a request made by the menu display section 434, and outputs the dynamic image to the menu display section 434. The menu display section 434 requests the image call section 436 to call the dynamic image to be used for creation of the menu image. The menu display section 434 creates a dynamic image of the menu by using the dynamic image obtained from the image call section 436 in response to the request, and displays the created dynamic image on the display device 332 of the video telephone 32.

The session processing section 486 of the rendering processing section 48 performs a processing for setting a communication session between the WEB server 26, which supplies WEB data desired by the user of the video telephone 32, and the WEB browse server 4. In addition, the session processing section 486 stores information on the user of the video telephone 32 to be required for access to the WEB browse server 4 and information (including an ID for identification of a terminal, a URL of a processing target, an image of the WEB page, link information, coordinates X, Y, H, and W of an image area being currently displayed, a magnification/reduction ratio, and a display mode) to be required for distribution of the dynamic image to the video telephone 32. The session processing section 486 outputs those stored information to the content processing section 460.

Figure 8:
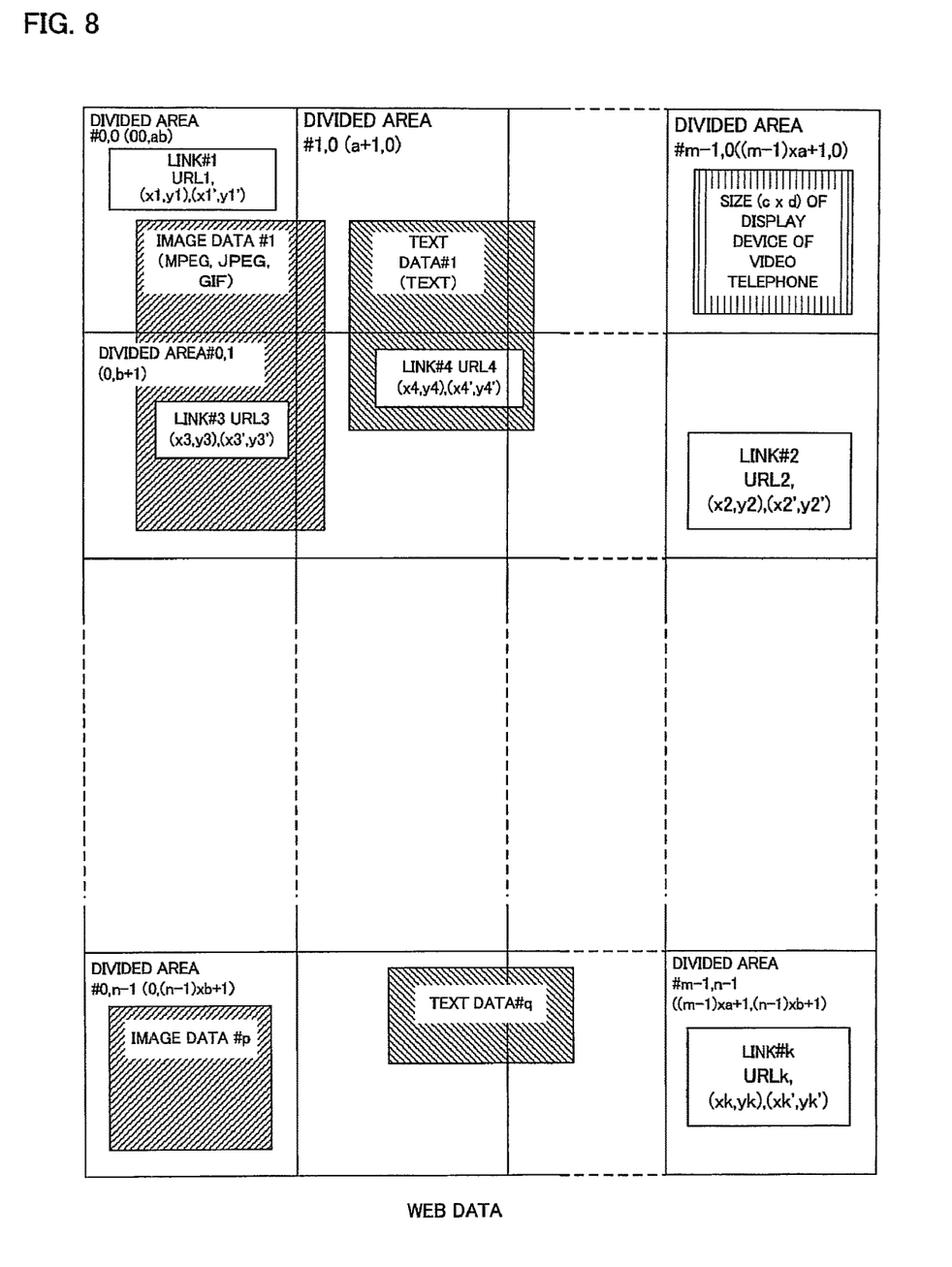
FIG. 8 is a diagram exemplifying WEB data supplied from the WEB server shown in FIG. 1 to the WEB browse server.

FIG. 8 is a diagram exemplifying WEB data supplied from the WEB server 26 shown in FIG. 1 to the WEB browse server 4. The WEB access section 480 accesses the WEB server 26 via the communication session set by the session processing section 486, obtains WEB data as shown in FIG. 8, and outputs the WEB data to the other components of the rendering processing section 48.

Note that as shown in FIG. 8, the WEB data contains text data, image data in the JPEG format, the GIF format, or the like which can be displayed on the video telephone 32 as an image, and a location (for example, uniform resource locator (URL)) of an internet resource that is linked from the WEB data. When dynamic image data in the MPEG format is supplied from a linked WEB server, the WEB access section 480 outputs the supplied dynamic image data to the content creation section 462 of the content processing section 460 in a state where a processing is performed by none of the other components of the rendering processing section 48.

From the WEB data (FIG. 8) inputted from the WEB access section 480, the image creation section 482 creates static image data that represents a static image having an area (a×b pixels) wider than a display area (c×d pixels) of the display device 332 of the video telephone 32. To be specific, for example, when the user of the video telephone 32 sees the menu shown in FIG. 7(A) and depresses the number "1"

button of the numeric keypad 342 (FIG. 3) to perform an operation for selecting the weather forecast for A District, as shown in FIG. 7(B), the image creation section 482 uses a URL specified by the operation to obtain the WEB data indicating the weather forecast for A District from the WEB server 26 and generate static image data from the obtained WEB data. The image creation section 482 outputs the generated static image data to the content processing section 460. From the WEB data, the link processing section 484 extracts a link contained in each WEB data item, obtains the URL of each link and the coordinates of the display range of the link contained in each WEB data item, and outputs the resultant information to the content processing section 460.

The media conversion section 468 of the content processing section 460 converts data to be displayed on the video telephone 32 other than the WEB data, such as data in the PDF format, into static image data corresponding to the WEB page (FIGS. 7(B) and 8). The media conversion section 468 further converts the static image data corresponding to the WEB page into dynamic image data in the MPEG format, and outputs the dynamic image data to the dynamic image distribution section 424. The link display section 466 creates link information for displaying a static image in which the display range of each of the links inputted from the link processing section 484 of the rendering processing section 48 is associated with an operation for selection of the corresponding one of the links. The link display section 466 creates link display information for indicating the display range of each link with, for example, a red frame within the WEB page and indicating the operation for selecting each link by the number or symbol corresponding to the button of the numeric keypad 342 to be depressed.

The image displacement section 464 performs a processing of moving an area within the WEB page to be displayed on the display device 332 of the video telephone 32, magnifying the area as indicated by the doffed line directed from FIG. 7(B) toward FIG. 7(D), or reducing the area as indicated by the dotted line directed from FIG. 7(D) toward FIG. 7(B). As shown in FIG. 7(B), the content creation section 462 uses the link information and the link display information to draw frame lines or the like for the link on the static image data created by the image creation section 482 or the media conversion section 468. Further, based on the information inputted from the session processing section 486 of the rendering processing section 48, as shown in FIG. 7(C), the content creation section 462 cuts out an area to be actually displayed on the display device 332 of the video telephone 32.

As necessary, as shown in FIG. 7(D), the content creation section 462 performs a processing of magnifying or reducing a part or entirety of the cut-out image to create static image data in the JPEG format which represents the contents to be displayed on the video telephone 32, and outputs the static image data to the media conversion section 468. Whether the cut-out image is magnified or reduced depends on whether the area of the cut-out image is smaller or larger than the size (QCIF) of the screen of the display device 332 of the video telephone 32. In other words, the area of the cut-out image is reduced when larger than the size of the screen of the display device 332, and magnified when smaller than the size of the screen of the display device 332.

Note that when the WEB page has a link to a dynamic image in the MPEG format instead of a WEB page in HTML and when the dynamic image data is inputted from the WEB access section 480, the content creation section 462 outputs the dynamic image data to the dynamic image distribution section 424. Thus, the dynamic image data transmitted from the content creation section 462 to the video telephone 32 via the dynamic image distribution section 424 can be displayed on the display device 332 of the video telephone 32 as it is.

Display Range and Link Selection

Hereinafter, description will be made of a processing for the WEB browse program 40 (FIG. 6) to select a display range of displaying a dynamic image on the display device 332 (FIG. 3) and select a link displayed within the dynamic image in response to a user's operation performed on the video telephone 32.

Figure 9:
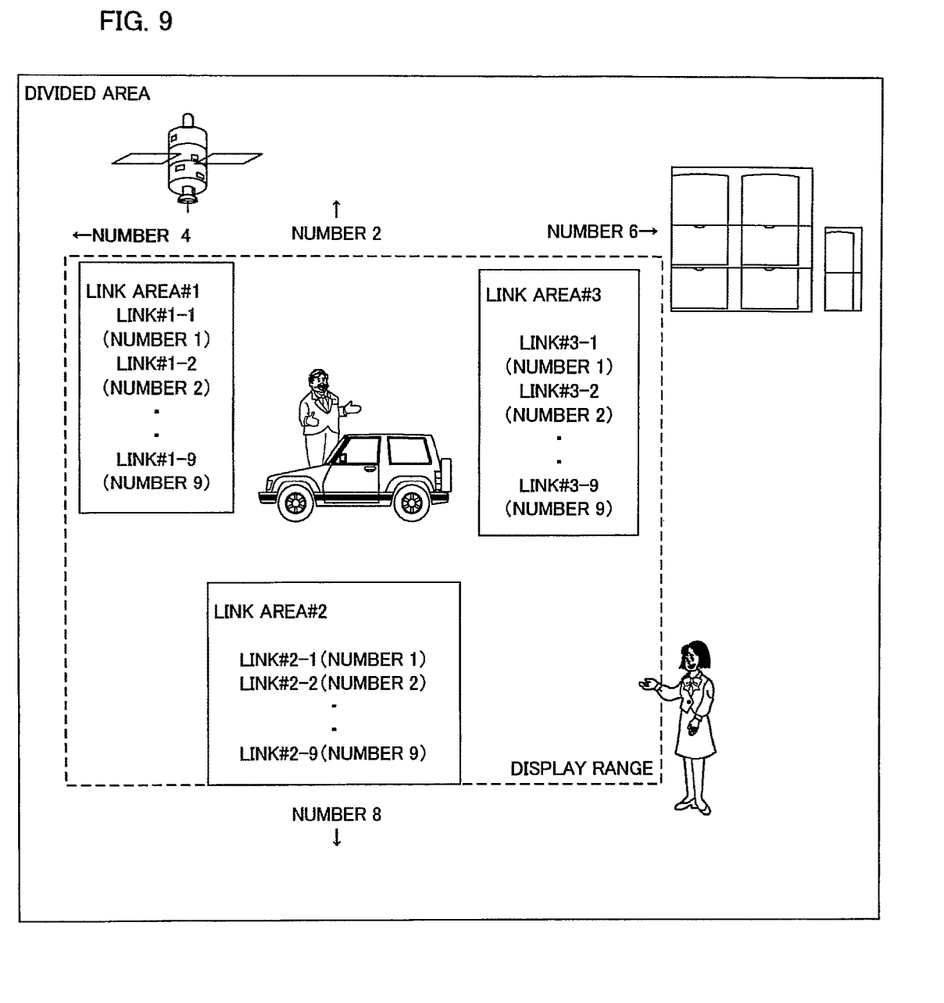
FIG. 9 is a diagram showing a processing in which the WEB browse program (FIG. 6) selects a display range of displaying the dynamic image on the display device (FIG. 3) in response to a user's operation performed on the video telephone.

FIG. 9 is a diagram showing a processing in which the WEB browse program 40 (FIG. 6) selects the display range of displaying the dynamic image on the display device 332 (FIG. 3) in response to the user's operation performed on the video telephone 32.

When the operation control section 430 displays a menu screen on the display device 332 of the video telephone 32 upon a call reception from the video telephone 32, the user of the video telephone 32 selects one of the numbers associated with the choices within the menu screen. The number selected by the user is identified as a DTMF signal by the response control section 422, and becomes an input value with respect to the VXML control section 432. The operation control section 430 controls the rendering processing section 48 to browse out the WEB data from the WEB server 26 (FIG. 1) by use of the URL corresponding to the number specified by the user. The rendering processing section 48 creates the static image data as shown in FIG. 9 from the read-out WEB data. The content processing section 460 first cuts out the display range indicated by the dotted line within the created static image data as an image, converts the resultant data into dynamic image data, and distributes the dynamic image data to the video telephone 32 as a dynamic image.

In the state shown in FIG. 9, for example, the operation control section 430 controls the content processing section 460 so as to move the display range upward on the screen when the number "2" is depressed on the video telephone 32, move the display range downward on the screen when the number "8" is depressed, move the display range rightward on the screen when the number "6" is depressed, and move the display range leftward on the screen when the number "4" is depressed. Further, for example, the operation control section 430 controls the content processing section 460 so as to reduce the dynamic image within the display range when the number "1" is depressed on the video telephone 32 and magnify the dynamic image within the display range when the number "3" is depressed. According to the control, the content processing section 460 creates a content by moving or magnifying/reducing the display range, and distributes the content to the video telephone 32 via the dynamic image distribution section 424. Note that in the state shown in FIG. 9, the user cannot select a link.

Figure 10:
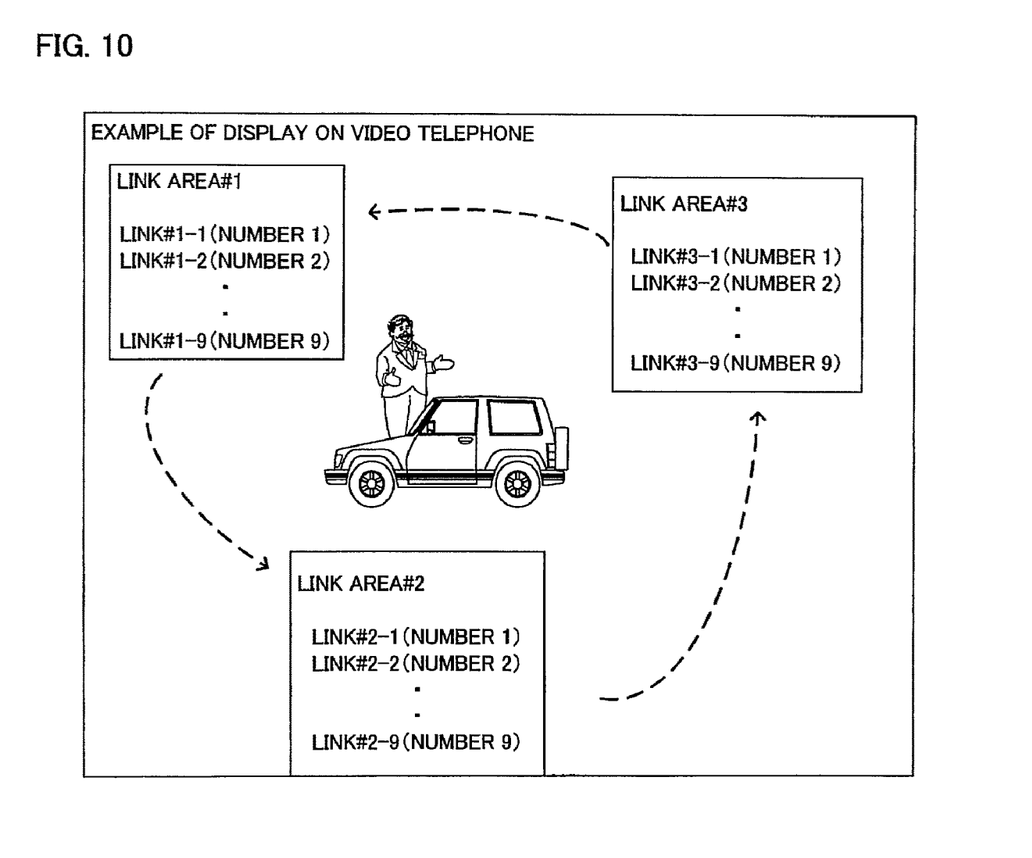
FIG. 10 is a diagram showing a processing for the WEB browse program (FIG. 6) to select a link displayed within the dynamic image displayed on the display device (FIG. 3) in response to a user's operation performed on the video telephone.

FIG. 10 is a diagram showing a processing for the WEB browse program 40 (FIG. 6) to select a link displayed within the dynamic image displayed on the display device 332 (FIG. 3) in response to the user's operation performed on the video telephone 32. When the user depresses, for example, the number "0" of the numeric keypad 342 of the video telephone 32 in the state for moving or magnifying/reducing the display range shown in FIG. 9, the operation control section 430 shifts to such a state for selecting a link as shown in FIG. 10. When the number "0" of the numeric keypad 342 of the video telephone 32 is depressed again in the state shown in FIG. 10, the operation control section 430 shifts to the state shown in FIG. 9. In other words, the user of the video telephone 32 can alternately select the state shown in FIG. 9 and the state shown in FIG. 10 by depressing the number "0".

In the state shown in FIG. 10, the content processing section 460 divides links into groups each of which is composed of, for example, 1 to 9 links, and creates a link image that indicates a link area in which an image indicating the links gathered into each group is associated with a number for selecting the links. The content processing section 460 distributes the dynamic image data containing the link image within the display range to the video telephone 32 via the dynamic image distribution section 424. When the user depresses, for example, the symbol "*" of the numeric keypad 342 of the video telephone 32 in the state shown in FIG. 10, the operation control section 430 selects link areas one by one as indicated in FIG. 10 by the dotted lines, and highlights the selected link area.

Further, when the user depresses, for example, any one of the numbers of the numeric keypad 342 of the video telephone 32 to select any one of the links contained in the selected link area, the operation control section 430 controls the rendering processing section 48 to obtain the WEB data from the WEB server 26 by use of the URL indicated by the selected link. According to this control, the rendering processing section 48 obtains the WEB data desired by the user from the WEB server 26. The content processing section 460 creates a content from the WEB data obtained by the rendering processing section 48, and distributes the content as dynamic image data to the video telephone 32 via the dynamic image distribution section 424.

Overall Operation of the Network System 1

Hereinafter, description will be made of an overall operation of the network system 1.

Figure 11:
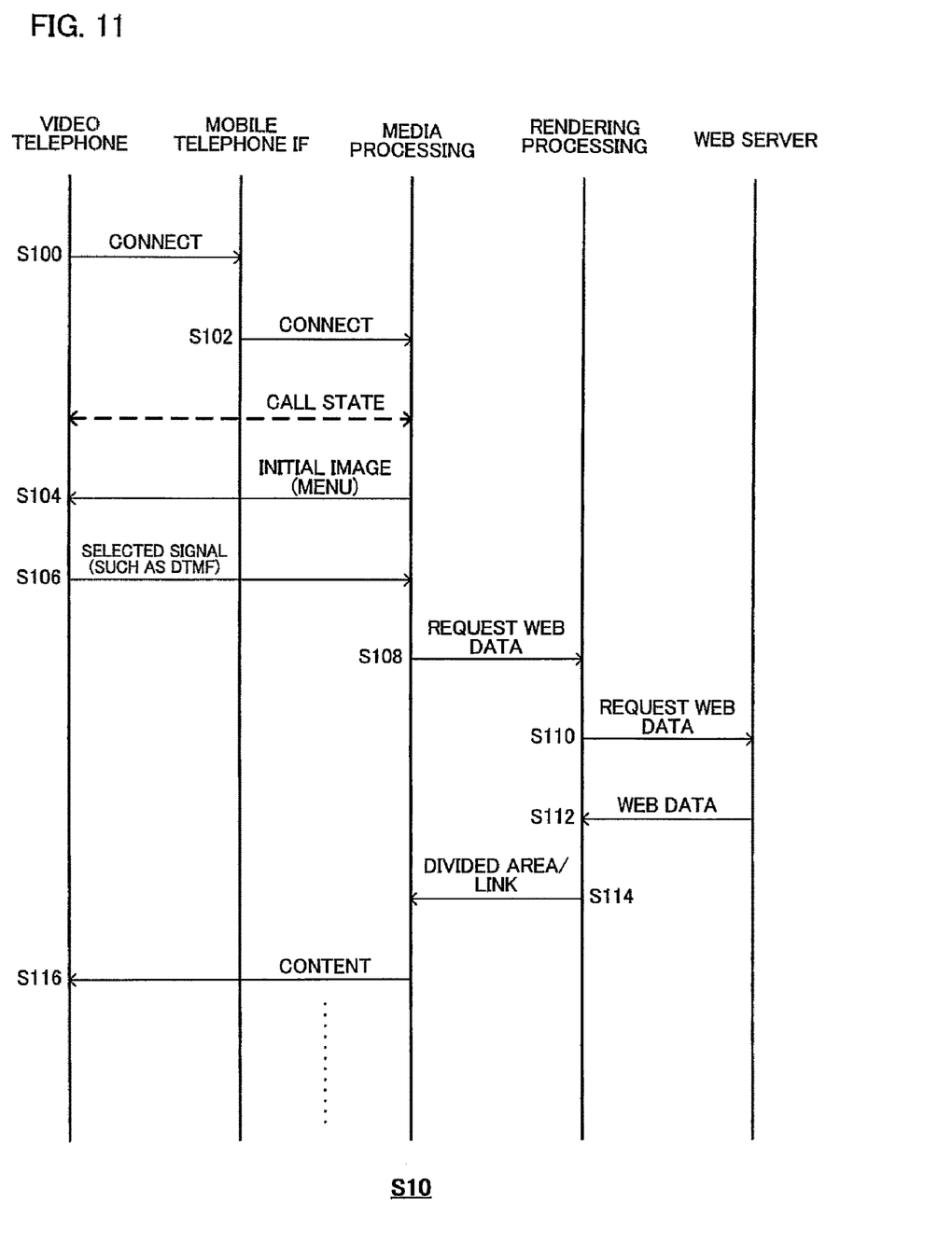
FIG. 11 is a communication sequence diagram showing an overall operation (S10) of the network system shown in FIG. 1.

FIG. 11 is a communication sequence diagram showing an overall operation (S10) of the network system 1 shown in FIG. 1. As shown in FIG. 11, in Step 100 (S100), the user operates the video telephone 32 to perform a call issuance to the WEB browse server 4 (WEB browse program 40; FIG. 6). In response to the call issuance, the mobile telephone network 30 connects the video telephone 32 with the WEB browse server 4 (WEB browse program 40) by a line.

In Step 102 (S102), the mobile telephone IF 400 of the WEB browse program 40 notifies the media processing section 42 of the connection from the video telephone 32, and a call state is established between the video telephone 32 and the media processing section 42, which makes it ready to transmit dynamic image data and audio data between the video telephone 32 and the media processing section 42.

In Step 104 (S104), the media processing section 42 transmits, for example, the dynamic image data of a menu image as an initial image to the video telephone 32. The video telephone 32 displays the menu image transmitted from the media processing section 42 on the display device 332 (FIG. 3).

In Step 106 (S106), when the user depresses, for example, the button of the numeric keypad 342 corresponding to the number indicating any one of the choices within the menu image displayed on the display device 332, the video telephone 32 transmits the audio data of the DTMF signal indicating the depressed button to the media processing section 42.

In Step 108 (S108), the media processing section 42 identifies the audio data of the DTMF signal, and based on the identification result, controls the rendering processing section 48 to obtain the WEB data from the WEB server 26 by use of the URL corresponding to the depressed number.

In Step 110 (S110), the rendering processing section 48 requests the WEB data desired by the user from the WEB server 26.

In Step 112 (S112), the rendering processing section 48 obtains the WEB data from the WEB server 26. Note that if the URL corresponding to the number depressed in the processing of Step S108 is a link to the dynamic image data in the MPEG format, the rendering processing section 48 obtains this dynamic image data.

In Step 114 (S114), the rendering processing section 48 creates a static image of the WEB page and information on its link, and outputs the static image and the information indicating the link to the media processing section 42. However, when the rendering processing section 48 obtains a dynamic image in the processing of Step S112, the rendering processing section 48 outputs this dynamic image data, without processing, to the media processing section. Note that the processing for moving/magnifying/reducing the display range and displaying the link area is performed at this stage.

In Step 116 (S116), in response to the user's operation, the media processing section 42 performs the state transition as shown in FIGS. 9 and 10, and performs the distribution to the video telephone 32. After that, the processes of Steps S100 to S116 are repeated, and the WEB browse server 4 provides the user of the video telephone 32 a function to browse a WEB page.

INDUSTRIAL APPLICABILITY

The present invention can be used for distribution of dynamic image data.

DESCRIPTION OF REFERENCE NUMERALS

1 . . . network system
2 . . . IP communication system
20 . . . IP network
22 . . . PDA device
120 . . . main body
122 . . . CPU
124 . . . memory
126 . . . input/output device
128 . . . network interface (IF)
130 . . . recording device
132 . . . recording medium
220 . . . client program
222 . . . operating system (OS)
224 . . . user interface (UI) section
226 . . . dynamic image processing section
228 . . . operation signal creation section
230 . . . application section
24 . . . PC
26 . . . WEB server
3 . . . video telephone system
30 . . . mobile telephone network
32 . . . video telephone
320 . . . antenna
322 . . . radio IF
330 . . . audio/video CODEC
332 . . . display device
334 . . . camera
336 . . . microphone
338 . . . speaker
340 . . . control section
342 . . . numeric keypad
344 . . . DTMF generation section
4 . . . WEB browse server
40 . . . WEB browse program
400 . . . mobile telephone IF
42 . . . media processing section 420 ... audio recognition section
422 ... response control section
424 ... dynamic image distribution section
430 ... operation control section
432 ... voice extensible markup language (VXML) control section
434 ... menu display section
436 ... image call section
438 ... image database (DB)
460 ... content processing section
462 ... content creation section
464 ... image displacement section
466 ... link display section
468 ... media conversion section
48 ... rendering processing section
480 ... WEB access section
482 ... image creation section
484 ... link processing section
486 ... session processing section

What is claimed is:

1. A dynamic image distribution device, comprising:
a memory storing machine readable instructions to:
generate, from image data corresponding to an input image, a dynamic image having a predetermined size in a predetermined format, wherein the input image comprises a larger size than the predetermined size;
transmit the generated dynamic image to an image display device via a transmission path,
receive at least one audio signal;
regenerate the generated dynamic image based on the at least one received audio signal; and
transmit the regenerated dynamic image to the image display device; and
a processor to implement the machine readable instructions.

2. The dynamic image distribution device according to claim 1, wherein the machine readable instructions are further to:
receive the image data;
render the received image data; and
convert the rendered image data into the generated dynamic image having the predetermined size, in the predetermined format, and based on the received audio signal.

3. The dynamic image distribution device according to claim 2, wherein:
the input image is associated with one or more reference image data items, each reference image data item representing a reference image to be transmitted to the image display device via the transmission path, and each of the one or more reference image data items is associated with the information represented by the at least one audio signal;
the machine readable instructions are further to:
identify the received at least one audio signal based on a selection from the reference image transmitted to the image display device, and to create the identification data;
supply the reference image data based on the created identification data; and
convert the supplied reference image data into the generated dynamic image in a format supported by the image display device.

4. The dynamic image distribution device according to claim 3, wherein:
the reference image data is supplied from a predetermined supply source; and
the machine readable instructions are further to obtain the reference image data from the supply source based on the created identification data.

5. The dynamic image distribution device according to claim 4, wherein:
the reference image data comprises WEB data; and
the predetermined supply source comprises a uniform resource locator (URL) associated with a location of the WEB data.

6. The dynamic image distribution device according to claim 3, wherein the machine readable instructions are further to:
provide the reference image data described in hypertext markup language (HTML); and
create the image data from the reference image data described in the HTML.

7. The dynamic image distribution device according to claim 6, wherein the machine readable instructions are further to:
receive a distributed input image in a moving picture experts group (MPEG) format; and
convert the image data created from the reference image data described in the HTML into a dynamic image data in the MPEG format.

8. The dynamic image distribution device according to claim 1, wherein the machine readable instructions are further to:
receive a dual tone multi frequency (DTMF) signal as the audio signal via the transmission path; and
create identification data that indicates the information represented by the DTMF signal.

9. The dynamic image distribution device according to claim 1, wherein
the machine readable instructions are further to:
supply a static image larger than a size of a screen of the image display device; and
generate the dynamic image representing a static image having a size corresponding to the screen of the image display device, in a format supported by the image display device from the image data corresponding to the static image larger than the screen of the image display device.

10. The dynamic image distribution device according to claim 1, wherein the image data is
document data displayed on a screen larger than the screen of the image display device.

11. The dynamic image distribution device according to claim 10, wherein the document data comprises WEB data.

12. A dynamic image distribution system, comprising:
an image display device; and
a dynamic image distribution device having:
a memory storing machine readable instructions to:
generate, from image data corresponding to an input image, a dynamic image having a predetermined size in a predetermined format, wherein the input image comprises a larger size than the predetermined size;
transmit the generated dynamic image to the image display device via a transmission path;
receive at least one audio signal from the image display device via the transmission path;
regenerate the generated dynamic image based on the at least one received audio signal; and
transmit the regenerated dynamic image to the image display device; and
a processor to implement the machine readable instructions.

13. A dynamic image distribution system according to claim 12, wherein the image display device and the dynamic image display device are connected to each other through the transmission path set by line switching.

14. A dynamic image distribution system according to claim 12, wherein the image display device and the dynamic image distribution device are connected to each other through the transmission path set by store-and-forward switching.

15. A dynamic image distribution method of distributing a dynamic image to an image display device, comprising:
- generating, by a processor, a dynamic image having a predetermined size in a predetermined format, the dynamic image generated from image data corresponding to an image that is larger than the;
- transmitting the generated dynamic image to an image display device via a transmission path;
- receiving an audio signal comprising information for modifying the generated dynamic image;
- regenerating the generated dynamic image based on the information in the received audio signal; and
- transmitting the regenerated dynamic image to the image display device.

16. A non-transitory computer readable medium comprising computer code executable by a computer, the computer code to:
- generate, from image data corresponding to an input image, a dynamic image having a predetermined size in a predetermined format, wherein the input image is larger than the predetermined size;
- transmit the generated dynamic image to an image display device via a transmission path;
- receive at least one audio signal comprising information to control the generation of the dynamic image;
- regenerate the generated dynamic image based on the at least one received audio signal; and
- transmit the regenerated dynamic image to the image display device.

17. A dynamic image distribution device for distributing a dynamic image to an image display device for: transmitting a plurality of selectable audios each representing information via a transmission path; receiving the dynamic image distributed via the transmission path; and displaying the dynamic image on a screen having a predetermined size, the dynamic image distribution device comprising:
- audio identification means for identifying the transmitted audios, and creating identification data that indicates the information represented by a selected audio;
- image supplying means for supplying image data representing an image that contains a static image and a dynamic image or either one of those and is larger than the screen of the image display device based on the created identification data;
- dynamic image generation means for generating a dynamic image, which represents an image having a size larger than the screen of the image display device, in a format that can be displayed by the image display device from the supplied image data representing the image larger than the screen of the image display device; and
- dynamic image distribution means for distributing the generated dynamic image to the image display device via the transmission path, wherein:
- the image supplying means supplies the dynamic image generation device with the image data of a portion outside the range of the image supplied to the dynamic image generation device only when the dynamic image to be displayed on the image display device becomes larger than the image supplied to the dynamic image generation device; and
- the dynamic image generation means converts the supplied image data into a dynamic image, which represents a range to be displayed on the screen of the image display device within an image having a size larger than the screen of the image display device, in the format that can be displayed by the image display device based on the created identification data.

* * * * *